2 Sheets--Sheet 1.

J. D. STARRITT.
Rotary-Cultivators.

No. 144,419. Patented Nov. 11, 1873.

WITNESSES.
John H. Lawlor
F. H. Herring

INVENTOR.
John D. Starritt
By Gridley & Warner
Attys

J. D. STARRITT.
Rotary-Cultivators.

No. 144,419.

2 Sheets--Sheet 2.

Patented Nov. 11, 1873.

WITNESSES.
John H. Lawlor
F. A. Herring

INVENTOR.
John D. Starritt
By Gridley & Warner
Attys

UNITED STATES PATENT OFFICE.

JOHN D. STARRITT, OF CHICAGO, ILLINOIS.

IMPROVEMENT IN ROTARY CULTIVATORS.

Specification forming part of Letters Patent No. 144,419, dated November 11, 1873; application filed May 17, 1873.

*To all whom it may concern:*

Be it known that I, JOHN D. STARRITT, of Chicago, in the county of Cook and State of Illinois, have invented a new, useful, and Improved Rotary Cultivator-Plow, of which the following is a full, clear, and exact description, which will enable others skilled in the art to which my invention appertains to make and use the same, reference being had to the accompanying drawing forming a part of this specification, and in which—

Figure 1:
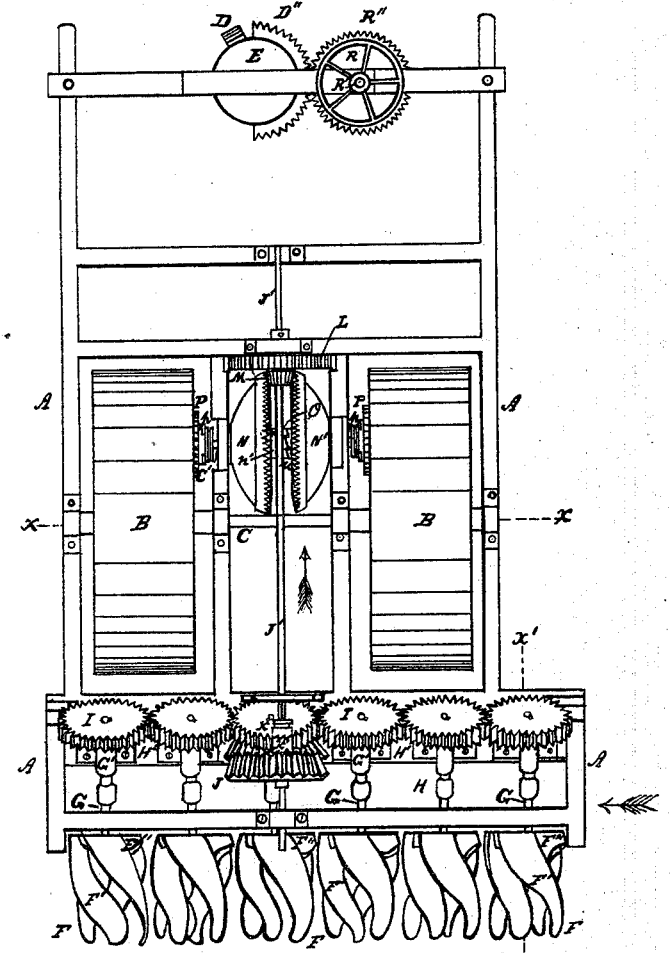
Figure 2:
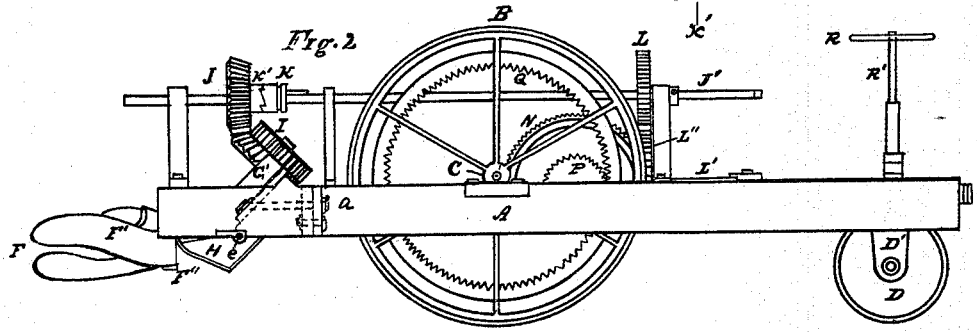
Figure 3:
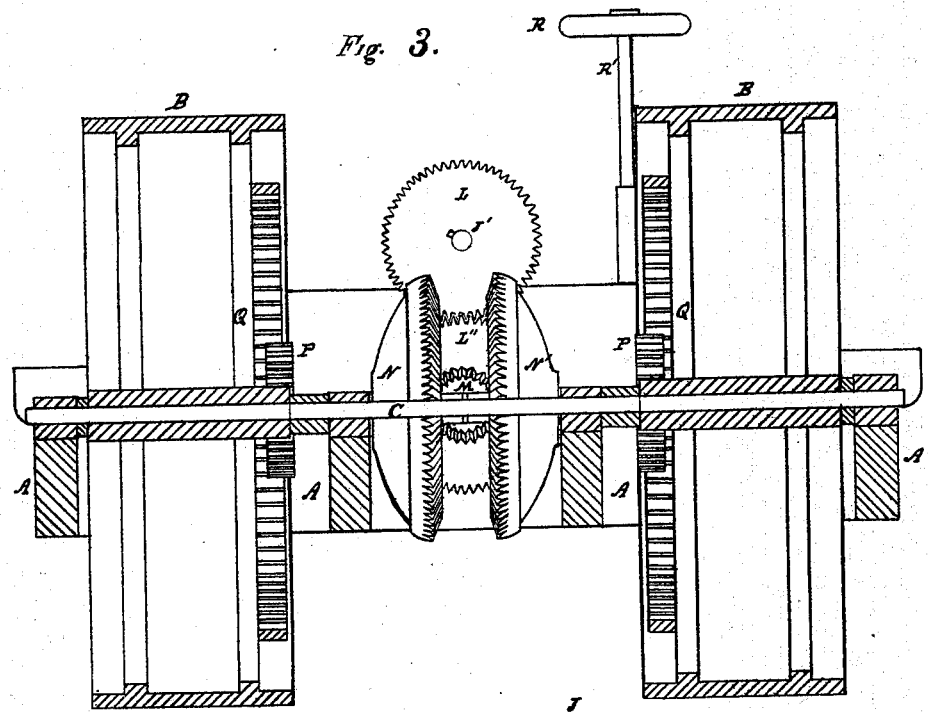
Figure 4:
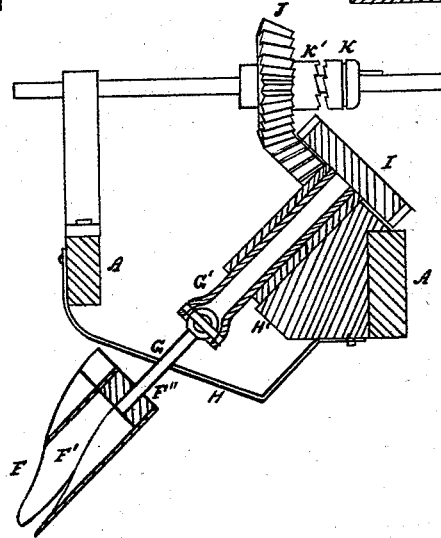

Figure 1 is a top or plan view of my improved device; Fig. 2, a side elevation thereof; Fig. 3, a vertical cross-section in the plane of the line $x\ x$ of Fig. 1, viewed in the direction indicated by the arrow there placed; and Fig. 4, a vertical longitudinal section in the plane of the line $x'\ x'$.

Like letters of reference indicate like parts.

In the drawing, A represents a frame suitable for the purpose of supporting the various parts of the implement. B B are the draft-wheels, and C is their axle, on which they are loosely mounted. D is a guide-wheel, the axle of which is journaled in the pendants D' D', rigidly attached to the spurred disk D'', pivoted to the forward part of the frame. E is a disk, rigidly attached to the frame, and arranged between the latter and the disk D'', so as to provide a broad bearing for the latter. The frame A is supported on the wheel D and by the axle C. F F are the rotary knives. These knives each consist of one or more spirally-formed blades, F' F', rigidly attached to a head-block, F'', and are arranged to extend from the rear face of the said block in a line perpendicular, or nearly so, to the said face, as shown. When each head-block is provided with two or more blades, the cutting-edges of the blades attached thereto are arranged parallel, or nearly parallel, to each other. G G are stems, rigidly attached to the central part of the head-blocks F'' F''. G' G' are inclined shafts, to which the stems G G are attached by means of a universal joint. By this means the knives are made to rotate during the rotation of the shafts G' G', and are capable, while being rotated, of vertically-yielding movement. In order to prevent the knives from yielding laterally, I arrange the stems G G through the rigid yokes or slotted pieces H H. I I are spur-wheels, engaging each other, and rigidly attached to the shafts G' G', having bearings on the inclined cross-piece H' of the frame A. J is a beveled gear-wheel, loosely mounted on the shaft J', and engaging a beveled wheel rigidly attached to one of the central shafts G'. K is a sliding clutch, provided with ratchet-teeth and feathered on the shaft J'. K' is a clutch, rigidly attached to the wheel J, and constructed for engagement with the clutch K.

It will be perceived that, when the clutches K and K' are engaged, and the shaft J' rotated, the rotary movement will be communicated to the knives F F, one-half of which will be turned in a contrary direction from the other half. It will also be observed that the knives incline downward and rearward, and that each blade will in succession cut and break the soil. The knives will also yield to uneven ground and to obstructions.

The shaft J' may be driven by any suitable power, preferably by means of a light steam-engine arranged on the forward part of the frame.

L is a spur-wheel, rigidly attached to the shaft J'. L' is also a shaft, and L'' is a spur-wheel rigidly attached thereto, and arranged to engage the wheel L. M is a beveled pinion, rigidly attached to the shaft L', and engaging the beveled cog-wheels N N', loosely mounted on the shaft C'. $n\ n'$ are clutch-blocks, provided with ratchet-teeth, and rigidly attached to the wheels N and N', respectively. O is a clutch-block feathered to the shaft C', and constructed and arranged to engage the blocks $n$ and $n'$ alternately. As the pinion M is rotated, the wheels N and N' will be rotated in opposite directions, and the direction of the rotation of the shaft C' may be thus reversed by sliding the clutch O from the clutch $n$ to the clutch $n'$; or this shaft may remain at rest by arranging the clutch O midway between the clutches $n$ and $n'$. P P are spur-wheels, loosely mounted on the shaft C', and engaging the cogs Q Q rigidly attached to the wheels B B. The inner faces of the wheels P P are provided with a clutch, rigidly attached thereto, and $p\ p$ are sliding clutch-blocks feathered to the shaft C', and constructed to engage the clutch-blocks on the wheels P P, respectively, so as to turn the said wheels in either direction.

It will be perceived, therefore, that the wheels B B may both be turned at the same time, either so as to carry the implement backward or forward; or either wheel may be turned in either direction alone, the other wheel being free to turn or not, according to the diameter of the circle in which the implement moves while being turned about. By arranging the clutch-blocks K and O so that they will not engage their corresponding clutches, the shaft J' may be driven independently of the remaining mechanism, and the engine and shaft may thus be employed for various purposes. The rear part of the frame A is attached to the forward part by means of the bolts $a$, so that the rear part and its attachments may be readily detached from the forward part.

During the operation of the implement the knives F F cut, break, and mix the soil, and leave it in a condition suitable for being sowed or planted with various grain or other seed.

R is a hand-wheel, rigidly attached to the shaft R', having suitable bearings in the frame A, and R" is a spur-wheel, also rigidly attached to the shaft R', and arranged to engage the spurred disk D, so that the direction of the implement may be readily changed by the operator.

The implement may be drawn by a team, and the knives driven by gearing operated by the wheels B B; and when the implement is adapted to be drawn by a team, it may be made much lighter than when an engine is used as a motive power, and may then be used as a cultivator and for other similar purposes. I do not, therefore, intend to limit myself to the employment of an engine as the motive power, nor to the driving gearing hereinbefore described; but

Having thus described my invention, what I claim as new, and desire to secure by Letters Patent, is—

In a rotary cultivator, the rotary knives F F, constructed and arranged substantially as described, and each having a free, independent, vertically-yielding movement with relation to the other by reason of the attachment of each to a corresponding rotary shaft by means of a universal joint, and by reason of the arrangement of the stems G G in the yokes H H, substantially as and for the purposes specified.

JOHN D. STARRITT.

Witnesses:
   JOHN H. LAWLOR,
   F. F. WARNER.